(12) United States Patent
Euler et al.

(10) Patent No.: US 7,433,970 B1
(45) Date of Patent: Oct. 7, 2008

(54) METHOD FOR PROVIDING PERFORMANCE CUES FOR A SERVER-BASED SOFTWARE APPLICATION

(75) Inventors: Timothy D. Euler, Shawnee Mission, KS (US); Jim F. Pearce, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 769 days.

(21) Appl. No.: 10/351,795

(22) Filed: Jan. 27, 2003

(51) Int. Cl.
*G06F 15/16* (2006.01)

(52) U.S. Cl. .................. 709/250; 709/217; 709/218; 709/219; 709/227; 709/228; 709/229; 709/250

(58) Field of Classification Search ......... 709/227–233, 709/250, 217–219
See application file for complete search history.

(56) References Cited

U.S. PATENT DOCUMENTS

| | | | | |
|---|---|---|---|---|
| 6,070,190 | A * | 5/2000 | Reps et al. | 709/224 |
| 6,567,767 | B1 * | 5/2003 | Mackey et al. | 702/186 |
| 6,567,854 | B1 * | 5/2003 | Olshansky et al. | 709/229 |
| 6,801,940 | B1 * | 10/2004 | Moran et al. | 709/224 |
| 6,973,622 | B1 * | 12/2005 | Rappaport et al. | 715/735 |
| 6,985,940 | B1 * | 1/2006 | Jenkin | 709/224 |
| 7,043,549 | B2 * | 5/2006 | Breese et al. | 709/224 |
| 7,069,337 | B2 * | 6/2006 | Rawlins et al. | 709/238 |
| 7,072,968 | B2 * | 7/2006 | Mikami et al. | 709/229 |
| 2002/0194293 | A1 * | 12/2002 | Osman | 709/213 |
| 2002/0194369 | A1 * | 12/2002 | Rawlins et al. | 709/238 |
| 2003/0055327 | A1 * | 3/2003 | Shaw et al. | 600/407 |
| 2003/0074393 | A1 * | 4/2003 | Peart | 709/203 |
| 2003/0099197 | A1 * | 5/2003 | Yokota et al. | 370/230 |
| 2004/0100651 | A1 * | 5/2004 | Leone et al. | 358/1.15 |
| 2005/0021767 | A1 * | 1/2005 | Cai | 709/228 |
| 2005/0022012 | A1 * | 1/2005 | Bluestone et al. | 713/201 |
| 2004/0111510 | A1 * | 12/2005 | Rappaport et al. | 370/352 |
| 2005/0265321 | A1 * | 12/2005 | Rappaport et al. | 370/352 |
| 2006/0031511 | A1 * | 2/2006 | Salt | 709/227 |

* cited by examiner

*Primary Examiner*—Nathan J. Flynn
*Assistant Examiner*—Mohamed Wasel

(57) ABSTRACT

The present invention provides a method for determining whether a server-based application will execute in an acceptable manner and thereafter providing this information to a user. After receiving a request for service relating to a particular application, the method retrieves the operational requirements for the application, which include the service admission control, content admission control, network admission control, and data admission control formula and the performance boundaries. Next, the values of the parameters required to evaluate the operational requirements are retrieved. The values of content admission control, network admission control, and data admission control are then calculated and used in the service admission control formula to determine the service admission control value for the application. Thereafter, the service admission control value is compared to the application's performance boundaries to determine the manner in which application will execute. Finally, a performance cue that corresponds to the relative manner in which the application will execute is displayed for the user.

40 Claims, 2 Drawing Sheets

METHOD FOR PROVIDING PERFORMANCE CUES FOR A SERVER-BASED SOFTWARE APPLICATION

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

This invention relates to the field of computer networks. More specifically, this invention relates to a method and system for providing a cue indicative of whether a server-based software application will perform in an acceptable manner when requested.

It is common for a software application to reside and execute on a server attached to a network. A software application may be stored on a server, for example, when a company wants to make the application available to its employees without having to purchase, maintain and upgrade a large number of single-user copies of the application. A server-based software application may also be employed when a company wants to make a proprietary application available over the Internet. By keeping the application on a server instead of downloading a copy of the application to each user who wants to execute the application, the company is able, for example, to prevent unauthorized copying and/or decoding of the application. Examples of server-based software applications include Packet Video Messaging, IP Telephony, Packet Video Conferencing Bridge and E-Mail.

One current problem with providing a software program that is stored and executed on a server is that an end-user who requests the application typically has no way to know if the program will execute in an acceptable manner at the time it is requested. The reason for this is that the factors that affect the execution of the program ordinarily are unknown and/or invisible to the end-user. Thus, when a user seeks to execute a network-based application and is unable to do so, he or she may spend valuable time attempting to determine the cause of the supposed problem and, most likely, become frustrated with the inability to execute the program.

Therefore, it is desirable to provide a method and system that will provide an end-user, prior to executing a server-based application, with an indication of the likelihood of successfully executing the application. Such an indication would allow an end-user to rapidly and accurately determine when it is cost-effective to initiate the application, reduce network peak loads, and alleviate the frustration and stress that may be caused by an unsuccessful attempt to perform an application. Additional advantages and novel features of the invention will be set forth in the description which follows, and in part will become apparent to those skilled in the art upon examination of the following, or may be learned from practice of the invention.

BRIEF SUMMARY OF THE INVENTION

The present invention provides a method and system for determining whether a server-based application will execute in an acceptable manner and thereafter providing this information to a user.

In one aspect of the invention, a method for providing a user with a cue indicative of the probability of successfully executing a server-based application prior to executing the application is provided. After receiving a request for service relating to a particular application, the method retrieves the operational requirements for the application, which include the service admission control, content admission control, network admission control, and data admission control formula and the performance boundaries. Next, the values of the parameters required to evaluate the operational requirements are retrieved. The values of content admission control, network admission control, and data admission control are then calculated and used in the service admission control formula to determine the service admission control value for the application. Thereafter, the service admission control value is compared to the application's performance boundaries to determine the manner in which application will execute. Finally, a performance cue that corresponds to the relative manner in which the application will execute is displayed for the user.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention includes a method and system for providing a user with a cue indicative of the probability of successfully executing a network-based application prior to executing the application. In one embodiment, the cue is visual, such as a text message or color-coded icon. In another embodiment, the cue is audible, such as a voice message or tone.

Figure 1:
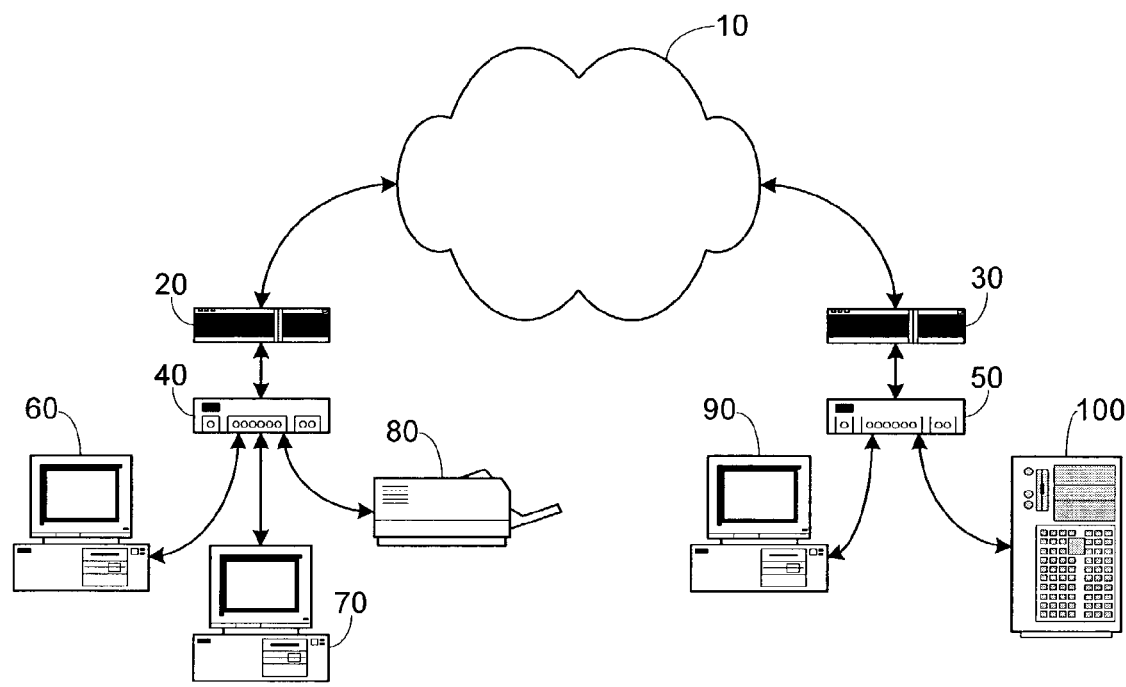
FIG. 1 is a block diagram showing an environment in which the present invention may be employed.

The present invention will operate in a network environment in which a network user may access an application that is stored and executed on a server. For the purpose of illustration, and not limitation, one environment in which the present invention may operate is depicted in FIG. 1, wherein a computer network, denominated by the numeral 10, is represented by a cloud. It should be understood that network 10 may contain a number of devices including, but not limited to, routers, repeaters, network adapters, network cards, servers, bridges, gateways, cables, wires, wireless transmitters and receivers, fiber optic cables and hardware, and telephone lines. It should also be understood that network 10 is not limited in size, that is, network 10 may be, without limitation, a local area network, a wide-area network, a metropolitan-area network, or the Internet.

Two routers, denominated by the numerals 20 and 30, are coupled to network 10. As those in the art will appreciate, a router is an intelligent device that processes network traffic. Routers 20 and 30 are operable to receive traffic from network 10, to determine whether the traffic is addressed to a device served by the router, and to transfer the traffic so addressed to its destination device. Routers 20 and 30 are further operable to receive traffic from a source device and transfer that traffic into network 10. Routers 20 and 30 also may be operable to create and strip packet headers, to maintain and update routing tables, to implement or process certain network protocols and/or procedures and any number of additional tasks. Both router 20 and router 30 contain network interfaces which allow them to be logically coupled to network 10. In this manner, router 20 and router 30 may become part of or help define network 10.

Continuing with FIG. 1, router 20 is also coupled to hub 40 while router 30 is also coupled to hub 50. As those in the art will further appreciate, a hub is a device that aggregates multiple connections onto a common backplane. A hub may also be used to implement or process certain network protocols and/or procedures. Hub 40 is also coupled to personal computers 60 and 70 and printer 80. Hub 50 is also coupled to personal computer 90 and server 100.

Generally speaking, a server is a multiuser computer that performs a specialized task. For example, a server may be a file server which provides a centralized storage mechanism for files needed by a group of users. A server may also be a print server which accepts print requests from networked devices, places these requests in a queue, and sends them to the appropriate printer. A server also may be an application server which stores and executes application software. Server 100 is an application server.

In operation, a user may use personal computer 40 to access a software application that is stored on server 100. When the user requests access to the software application stored on server 100, personal computer 40 establishes a logical connection across network 10 to server 100. This logical connection runs through hub 40 to router 20 and then to network 10. After traversing the various devices that make up network 10, the connection continues through router 30 to hub 50 and then to server 100. Thereafter, instructions and data may travel between personal computer 40 and server 100. The software application, however, remains on server 100 where it is executed.

The question of whether a server-based software application will perform when requested by an end-user has depended heretofore on the value of Admission Control. Traditionally, Admission Control is defined as a binary gate wherein a value of one means that an application can be admitted to execute and a value of zero means that an application cannot be admitted to execute. Utilizing admission control as a binary gate is based on the concept of non-elastic applications, that is, applications that can operate only if sufficient resources are available. Experience has shown, however, that many applications may operate with less than the envisioned resources although that operation may not be optimal.

In the present invention, whether a server-based software application will perform as desired when requested by an end-user is represented by the value of a variable called Service Admission Control (SAC) with the value of SAC denoting the probability that an application will operate as intended. Thus, if SAC is equal to one then the application will operate as expected by the application creator and if SAC is equal to zero then the application will not operate. Unlike the traditional view of admission control, however, SAC may equal any value between zero and one, with values closer to one indicating that the application is more likely to perform as desired.

SAC depends on several factors, which will be referred to as Content Admission Control (CAC), Network Access Control (NAC), and Device Admission Control (DAC). The relationship between these factors may be expressed generally as follows:

$$SAC = f(CAC(c_1, c_2, \ldots, c_n), NAC(n_1, n_2, \ldots, n_n), DAC(d_1, d_2 \ldots, d_n))$$

wherein $c_1, c_2, \ldots, c_n, n_1, n_2, \ldots, n_n$, and $d_1, d_2 \ldots, d_n$ represent the parameters from which these values depend. In one embodiment of the present invention, the values of CAC, NAC and DAC are each normalized to a value between zero and one inclusive, and these values are then multiplied together to find SAC.

Content Admission Control (CAC) relates to the application server's, or host's, ability to deliver the desired service when requested. Consider a server that can service up to 150 requests for a particular application at any given time and that for the first 100 requests there is no degradation of its performance but, if there are more than 100 requests (i.e., 100-150), then the server's performance will be reduced to 50% of its peak. Thus, for this example, CAC is dependent in part on the number of requests being serviced by the server. If it is assumed that CAC is a value between zero and one, with one signifying that server has the complete ability to deliver the service requested, then, when the end-user requests service in the present example, CAC will be 1.0 if there are less than 100 requests already being serviced, but if there are between 100 and 149 requests being serviced, then CAC will be 0.5, and if there are 150 requests already being serviced, then CAC will equal zero. Other parameters that may affect CAC include, without limitation, the server's available memory and the server's processor speed. It should be understood that CAC may depend on one or more parameters.

Network Access Control (NAC) relates to the ability of the network to support the application when it is requested. One factor that may affect NAC is the network's available bandwidth. For example, an application may require that at least 1 megabytes of bandwidth be allocated to communication between the server and the end-user in order for the application to perform at 100% efficiency, and if less than 1 megabytes of bandwidth are available, then the application will not work at all. Thus, in this situation, NAC is dependent on the amount of bandwidth available from the network. Other parameters that may affect NAC include, without limitation, the distance between the server and end-user and the average transmission rate of the network. It should be understood that NAC may depend on one or more parameters.

Device Admission Control (DAC) relates to the end-user's own resources. A software application may require, for example, that the end-user's computer have at least 1 megabytes of random access memory (RAM) available if the application is to perform at 50% effectiveness. Further, the application may indicate that if the end-user's computer has at least 2 megabytes of RAM available then the application will run at 100% effectiveness. Thus, in this example, DAC is dependent on the amount of RAM available in the end-user's computer. Other parameters that may affect DAC include, without limitation, the end-user's computer's processor speed and the speed of the computer's modem or other network access device. It should be understood that DAC may depend on one or more parameters.

The parameters from which the values of CAC, NAC and DAC depend may be determined for every server-based application by methods understood by those in the field. Further, the relationship between the factors, that is the function that determines SAC, may also be determined by methods understood by those in the field. Finally, the range of values for SAC may be examined to determine, for example, which values are indicative of acceptable performance, which values are indicative of marginal performance, and which values are indicative of unacceptable performance. These values are referred to as performance boundaries. Thus, acceptable performance implies that the value of SAC falls within the range from one to the marginal performance boundary, marginal performance implies that the value of SAC falls within the range from the marginal performance boundary to the unacceptable performance boundary, unacceptable performance implies that the value of SAC falls between the range from the unacceptable performance boundary to zero, and the application is unavailable if the value of SAC equals zero.

Figure 2:
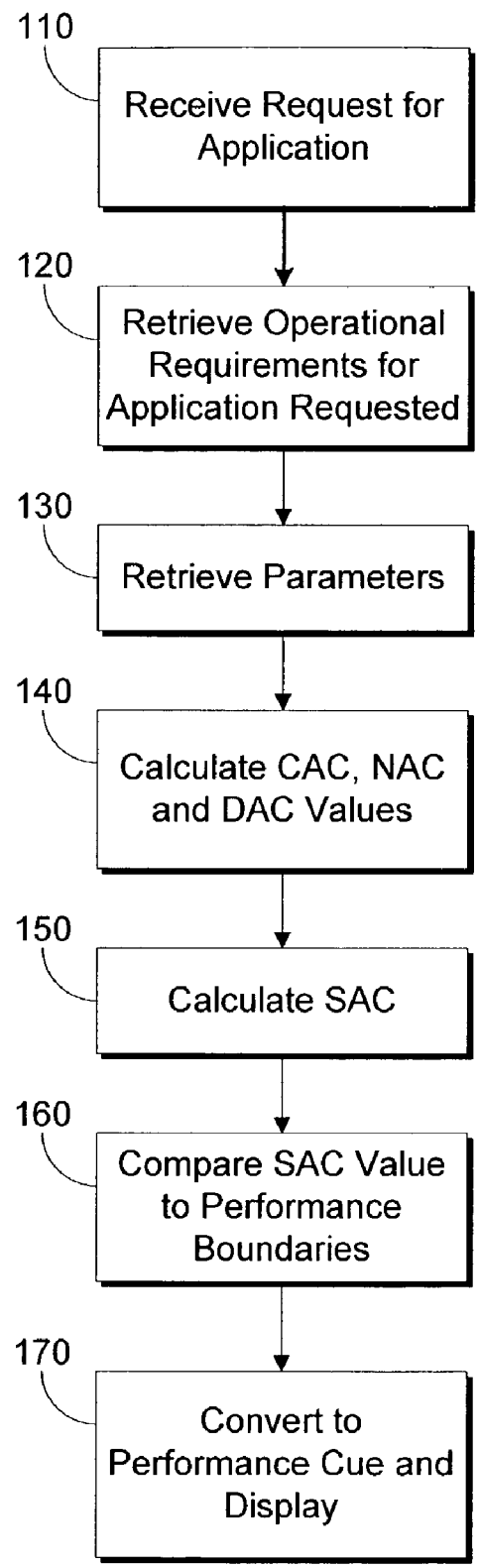
FIG. 2 is a flow chart representing one embodiment of the present invention.

Referring now to FIG. 2, in one embodiment the present invention is a method that begins at step 110 when a request for a particular server-based application is received. In a Microsoft Windows™-based system, a request may be made by pointing at and then clicking on the icon that represents the application.

Once the request is received, the operational requirements for the specific application are retrieved at step 120. It should be understood that the operational requirements for a specific application include the functions that define SAC, CAC, NAC and DAC, and that the particular parameters that define CAC, NAC and DAC may be determined from these functions. In addition, the performance boundaries are also retrieved at this time. It should also be understood that the requirements may be located in a single database, in multiple databases, or in a file stored on the server with the executable version of the application.

In step 130, the actual value for each of these parameters is determined. The manner in which the parameter values are determined is known to those in the field. For example, if a parameter for NAC involves the time to transmit between the client and host, then the method may cause a packet to be sent from the client to the host and measure the time it takes for the host to send a packet back to the client.

Next, at step 140, the values of CAC, NAC and DAC are calculated using the actual parameter values and the functions retrieved in step 120. In one embodiment, the values of CAC, NAC and DAC are normalized to a value between zero and one.

At step 150, the value of SAC is determined. This calculation occurs by inserting the values of CAC, NAC and DAC calculated in step 140 into the function retrieved in step 120.

At step 160, the value of SAC is compared to the performance boundaries to determine the level of performance expected for the application at this time. As explained above, in one embodiment, the value of SAC may indicate that the application will perform in an acceptable manner, in a marginal manner, in an unacceptable manner or not at all. In this embodiment, acceptable performance implies that the value of SAC falls within the range from one to the marginal performance boundary, marginal performance implies that the value of SAC falls within the range from the marginal performance boundary to the unacceptable performance boundary, unacceptable performance implies that the value of SAC falls between the range from the unacceptable performance boundary to zero, and the application is unavailable if the value of SAC equals zero.

Figure 3:
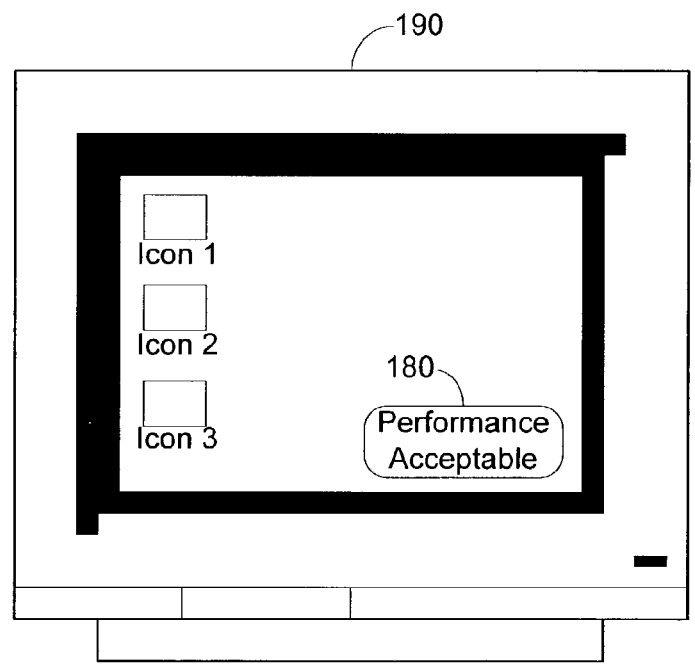
FIG. 3 is a front elevational view of a computer monitor with a performance cue displayed thereon.

Once the level of performance is determined, then the level is translated into a cue at step 170. There are many types of cues that may be provided to the user requesting the service, including without limitation, visual cues and audible cues. Referring to FIG. 3, in one embodiment, the cue is a text message that appears in a window 180 on the end-user's computer monitor 190. In another embodiment, the cue is a color-coded icon that appears next to the application's icon on the end-user's computer monitor. In yet another embodiment, the cue is a voice message played over the end-user's computer's speaker.

As one skilled in the art will appreciate, in addition to a method, the present invention may be embodied as a computer-program product. Thus, in one embodiment, the present invention takes the form of a computer-program product that includes computer-useable instructions embodied on a computer-readable medium. Computer-readable media contemplates media readable by a database, a switch, and various other network devices and may comprise computer-storage media and communications media. Computer-storage media include media implemented in any method or technology for storing information including, but are not limited to: RAM, ROM, EEPROM, flash memory or other memory technology, CD-ROM, Digital Versatile Disks (DVD), holographic media or other optical disk storage, magnetic cassettes, magnetic tape, magnetic disk storage, and other magnetic storage devices. Communications media typically embody computer-useable instructions—including data structures and program modules—in a modulated data signal. By way of example, but not limitation, communication media include wired media, such as a wired network or direct-wired connection, and wireless media such as acoustic, infrared, radio, microwave, spread-spectrum, and other wireless media technologies. Combinations of the above are included within the scope of computer-readable media.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. A method in a computer system, comprising at least one server coupled to one or more client devices, for providing a single, predictive cue indicative of the likelihood of successfully executing a server-based software application ("application") by a client device, said application being associated with a set of operational requirements, and said method comprising:

on said at least one server,
    (1) receiving a set of stored client-side parameters that indicate an ability of said client device to utilize said application;
    (2) receiving a set of stored server-side parameters that indicate server resources available to execute said application;
    (3) receiving a set of network-related parameters that indicate an availability of network resources to provide access to said application;
    (4) based on said client-side parameters, said server-side parameters, and said network-related parameters, determining an execution indicator that indicates a level of anticipated successful execution of said application, wherein said execution indicator is one of a plurality of values; and
based on said execution indicator, providing to said client device said single, predictive cue that indicates a likelihood of success associated with executing said application.

2. The method of claim 1 further comprising:
defining said operational requirements; and
storing said operational requirements.

3. The method of claim 2 wherein said operational requirements are stored in a database.

4. The method of claim 2 wherein said operational requirements are stored in a plurality of databases.

5. The method of claim 2 wherein said operational requirements are stored in a file on said at least one server.

6. The method of claim 1 further comprising receiving a request for said application from said client device.

7. The method of claim 1 further comprising requesting the operational requirements for said application.

8. The method of claim 1 further comprising requesting the values for said client-side parameters, said server-side parameters and said network-related parameters.

9. The method of claim 1 wherein said server-side_parameters include an indication of an amount of memory available at said at least one server.

10. The method of claim 1 wherein said server-side_parameters include an indication of a processor speed of said at least one server.

11. The method of claim 1 wherein said network-related parameters include an indication of bandwidth available for the communication between said client device and said at least one server.

12. The method of claim 1 wherein said client-side parameters include an indication of an amount of memory available at said client device.

13. The method of claim 1 wherein said client-side parameters include an indication of a processor speed of said client device.

14. The method of claim 1 wherein said execution indicator is indicative of acceptable execution, marginal execution, and unacceptable execution.

15. The method of claim 1 wherein said cue includes a visual cue.

16. The method of claim 15 wherein said cue includes a test message.

17. The method of claim 15 wherein said cue includes a color-coded icon.

18. The method of claim 1 wherein said cue includes an audible cue.

19. The method of claim 18 wherein said cue includes a voice message.

20. The method of claim 1 wherein said value can be between zero and one, or a scaled variation thereof.

21. One or more computer-readable storage media comprising computer-useable instructions embodied thereon for causing a computer system, comprising at least one server coupled to one or more client devices, to provide a client device a single, predictive cue indicative of the likelihood of successfully executing a server-based software application ("application"), said application having a set of operational requirements, and said method comprising:
   on said at least one server,
   (1) receiving a set of stored client-side parameters that indicate an ability of said client device to utilize said application;
   (2) receiving a set of stored server-side parameters that indicate server resources available to execute said application;
   (3) receiving a set of network-related parameters that indicate an availability of network resources to provide access to said application;
   (4) based on said client-side parameters, said server-side parameters, and said network-related parameters, determining an execution indicator, wherein said execution indicator is one of a plurality of values; and
   comparing said execution indicator to one or more threshold values corresponding to levels of anticipated successful execution based on said operational requirements;
   based on said comparison, providing to said client device said single, predictive cue that indicates a potential level of success associated with executing said application.

22. The computer-readable storage media of claim 21 in which said method further comprises:
   defining said operational requirements; and
   storing said operational requirements.

23. The computer-readable storage media of claim 22 wherein said operational requirements are stored in a database.

24. The computer-readable storage media of claim 22 wherein said operational requirements are stored in a plurality of databases.

25. The computer-readable storage media of claim 22 wherein said operational requirements are stored in a file on said at least one server.

26. The computer-readable storage media of claim 21 further comprising receiving a request for said application from said client device.

27. The computer-readable storage media of claim 21 further comprising requesting the operational requirements for said application.

28. The computer-readable storage media of claim 21 further comprising requesting the values for said client-side parameters, said server-side parameters and said network-related parameters.

29. The computer-readable storage media of claim 21 wherein said server-side parameters include an indication of an amount of memory available at a said at least one server.

30. The computer-readable storage media of claim 21 wherein said server-side parameters include an indication of a processor speed of a said at least one server.

31. The computer-readable storage media of claim 21 wherein said network-related parameters include an indication of bandwidth available for the communication between said end-user and said at least one server.

32. The computer-readable storage media of claim 21 wherein said client-side parameters include an indication of an amount of memory available at said client device.

33. The computer-readable storage media of claim 21 wherein said client-side parameters include an indication of a processor speed of said client device.

34. The computer-readable storage media of claim 21 wherein said value indicative of the level of successful execution of said server-based software application is indicative of acceptable execution, marginal execution, and unacceptable execution.

35. The computer-readable storage media of claim 21 wherein said cue includes a visual cue.

36. The computer-readable storage media of claim 35 wherein said cue includes a test message.

37. The computer-readable storage media of claim 35 wherein said cue includes a color-coded icon.

38. The computer-readable storage media of claim 21 wherein said cue includes an audible cue.

39. The computer-readable storage media of claim 38 wherein said cue includes one or more of:
   a voice message; and
   a tone.

40. A computer system for providing a single, predictive cue that indicates an anticipated level of successfully executing a server-based software application ("application") when a client device submits a request for said application, wherein said application is associated with a set of operational requirements, said system comprising:
- at least one server device that can be coupled to a client device by one or more networks, said at least one server device configured to provide an execution indicator that indicates a level of potential execution performance of said application;
- wherein said execution indicator can be a continuous value; and
- wherein said indicator is determined by said at least one server from a set of parameters that includes,
  - i. an indication of said client device's available resources to execute said application;
  - ii. an indication of said server device's available resources to execute said application; and
  - iii. an indication of availability of said network resources associated with said one or more networks to provide access to said application; and
- wherein said at least one server device is further configured to provide, based on said execution indicator, said single, predictive cue that can be provided to said client device that indicates a level of potential execution performance of said application.

* * * * *